United States Patent
Marr et al.

(10) Patent No.: US 7,398,368 B2
(45) Date of Patent: Jul. 8, 2008

(54) ATOMIC OPERATION INVOLVING PROCESSORS WITH DIFFERENT MEMORY TRANSFER OPERATION SIZES

(75) Inventors: James E. Marr, Burlingame, CA (US); John P. Bates, Redwood City, CA (US); Attila Vass, Foster City, CA (US); Tatsuya Iwamoto, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 284 days.

(21) Appl. No.: 11/291,306

(22) Filed: Dec. 1, 2005

(65) Prior Publication Data

US 2007/0130438 A1 Jun. 7, 2007

(51) Int. Cl.
*G06F 12/00* (2006.01)

(52) U.S. Cl. .................. 711/168; 711/153; 712/14; 712/28; 712/34

(58) Field of Classification Search .................. None
See application file for complete search history.

(56) References Cited

U.S. PATENT DOCUMENTS

| | | | |
|---|---|---|---|
| 5,581,777 A | * | 12/1996 | Kim et al. .................. 712/16 |
| 5,864,706 A | * | 1/1999 | Kurokawa et al. ............ 712/35 |
| 5,864,738 A | | 1/1999 | Kessler et al. .............. 709/239 |
| 6,029,212 A | | 2/2000 | Kessler et al. ............... 710/52 |
| 7,274,706 B1 | | 9/2007 | Nguyen et al. ............. 370/419 |
| 2005/0120185 A1 | | 6/2005 | Yamazaki et al. ........... 711/147 |

OTHER PUBLICATIONS

Office Action - U.S. Appl. No. 11/291,307; mailed Feb. 1, 2008.

* cited by examiner

*Primary Examiner*—Reginald Bragdon
*Assistant Examiner*—Horace L. Flournoy
(74) *Attorney, Agent, or Firm*—Joshua D. Isenberg; JDI Patent (57) ABSTRACT

Atomic operations may be implemented on a processor system having a main memory and two or more processors including a power processor element (PPE) and a synergistic processor element (SPE) that operate on different sized register lines. A main memory address containing a primitive is divided into a parity byte and two or more portions, wherein the parity byte includes at least one bit. A value of the parity byte determines which of the two or more portions is a valid portion and which of them is an invalid portion. The primitive is of a memory size that is larger than a maximum size for atomic operation with the PPE and less than or equal to a maximum size for atomic operation with the SPE. Read with reservation and conditional write instructions are used by both the PPE and SPE to access or update a value of the atomic.

32 Claims, 5 Drawing Sheets

ATOMIC OPERATION INVOLVING PROCESSORS WITH DIFFERENT MEMORY TRANSFER OPERATION SIZES

CROSS-REFERENCE TO RELATED APPLICATION

This application is related to commonly-assigned U.S. patent application Ser. No. 11/291,307 entitled "CELL PROCESSOR ATOMIC COMPARE AND SWAP USING DEDICATED SPE" to James E. Marr and John P. Bates, which is filed the same day as the present application, the entire disclosures of which are incorporated herein by reference.

FIELD OF THE INVENTION

This invention relates to cell processors and more particularly to atomic operations with cell processors.

BACKGROUND OF THE INVENTION

Cell processors are a type of microprocessor that utilizes parallel processing. The basic configuration of a cell processor includes a "Power Processor Element" ("PPE") (sometimes called "Processing Element", or "PE"), and multiple "Synergistic Processing Elements" ("SPE"). The PPEs and SPEs are linked together by an internal high speed bus dubbed "Element Interconnect Bus" ("EIB"). Cell processors are designed to be scalable for use in applications ranging from the hand held devices to main frame computers.

A typical cell processor has one PPE and up to 8 SPE. Each SPE is typically a single chip or part of a single chip containing a main processor and a co-processor. Each SPE typically includes a synergistic processor unit (SPU) and a local store (LS). The PPE typically includes a power processor element (PPU) and one or more caches. All of the SPEs and the PPE can access a main memory, e.g., via the bus. The SPEs can perform parallel processing of operations in conjunction with a program running on the PPE. To coordinate processes executing in parallel on the SPE and PPE, atomic operations are often implemented. An atomic operation is one in which an SPU or PPU can read or write to a memory address (often referred to as an atomic) in a single operation while denying other processors access to the atomic. Atomic operations can be mutual exclusion (muxtex) "locked" operations or "lock-free" operations. In a mutex operation, a processor locks the atomic and prevents other processors from writing to it until it is unlocked. In a "lock-free" atomic operation, the only one processor can write to the atomic address at a time, but other processors can write over what has been atomically written. Lock-free atomic operations utilize "reservation" operations that notify a processor making the reservation whether an atomic has been overwritten since the reservation was made.

A problem with atomic operations on cell processors is that the PPU and SPU have different reservations sizes for atomic operations. These different atomic operation sizes are a result of different sized memory access capabilities of the PPU and SPU. The PPU's memory access, is generally limited by the register size of the PPU core. The cell processor architecture does not define how large the atomic operation size is for the SPU. However, the SPU can access the main memory through a memory flow controller (MFC), which can transfer data in increments much larger than the register size of the PPU core. For example, in certain types of cell processors, the MFC for an SPU can transfer data into and out of main memory in 128 byte chunks (or smaller) but the PPU can transfer data in only 8 byte chunks (or smaller). The maximum PPU memory transfer size for a single operation is determined by the size of the PPU register set. The PPU register length is 64 bits, 8 bytes of 8 bits each. The MFC sets the SPU atomic size. The SPU local store is in the form of 16 byte, 128 bit registers. The SPU local store registers are not tied to any main memory address. The SPU communicates with memory though the MFC, which operates on 128 byte chunks. The MFC handles direct memory access (DMA) operations for both atomic and non-atomic operations for the SPU. In certain cell implementations, all atomic operations on the SPU are 128 bytes. However, non-atomic operations are also handled by the MFC and can range in size from 1 byte to 16 kilobytes. Thus, SPUs perform read with reservation and copy 128 bytes into their local stores. The reservation granule can be any size. It will logically work correctly as long as it is larger than the atomic access size.

It is very powerful that the SPU can work atomically on large chunks of data and it can be quite crippling that the PPU can only work atomically on 8 bytes at a time. Such different sizes for atomic reservations can limit the features of a lock-free algorithm. Linked lists without mutex can be done using lock-free algorithms. However, if larger atomics are available, one can apply lock-free algorithms to more complex operations since more than one integer may be atomically modified at a time.

Thus, there is a need in the art, for a way to perform atomic operations with a cell processor where the PPE and SPE have different-sized register lines.

SUMMARY OF THE INVENTION

According to embodiments of the present invention atomic operations may be implemented on a processor system having a main memory and two or more processors including a power processor element (PPE) and a synergistic processor element (SPE) that operate on different sized register lines. A main memory address containing a primitive is divided into a parity byte and two or more portions, wherein the parity byte includes at least one bit. A value of the parity byte determines which of the two or more portions is a valid portion and which of them is an invalid portion. The primitive is of a memory size that is larger than a maximum size for a memory transfer operation with the PPE and less than or equal to a maximum size for a memory transfer operation with the SPE.

The SPE can update the primitive by performing a read with reservation on a value of the parity byte and at least the valid portion. The SPE may then update the valid portion to produce an updated valid portion. The SPE may then conditionally write back the value of the parity byte without changing it and write the updated valid portion to the address containing the primitive. The SPE writes the updated valid portion to the address containing the primitive if the reservation has not been lost. If the reservation has been lost, the SPE may repeat the read with reservation, updating and conditional write until the conditional write is successful.

The PPE may update the primitive by performing a read with reservation of the parity byte and writing to one or more subsections of the invalid portion with each subsection being of a size that the PPE can update in a single memory transfer operation. The PPE can then perform a conditional write of a new value to the parity byte. Upon successful completion of the conditional write operation, the value of the parity byte is changed to a new value that makes the invalid portion valid and vice versa.

The PPE may read the value of the primitive by performing a read with reservation of an initial value of the parity byte and performing successive read operations on one or more subsections of the invalid portion. Each subsection is of a size that the PPE can update in a single memory transfer operation. The PPE can then perform a conditional write upon the parity byte with the initial value with the PPE.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
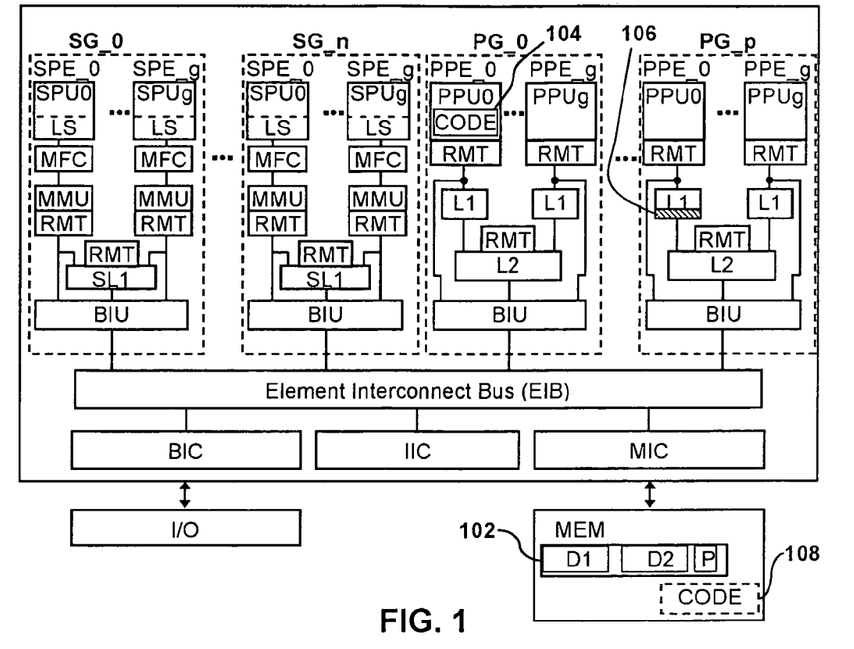
FIG. 1 is a schematic diagram of a cell broadband engine architecture implementing Cell Task and Data Management according to an embodiment of the present invention.

By way of example, and without limitation, FIG. 1 illustrates a type of cell processor 100 characterized by an architecture known as Cell Broadband engine architecture (CBEA)-compliant processor. A cell processor can include multiple groups of PPEs (PPE groups) and multiple groups of SPEs (SPE groups) as shown in this example. Alternatively, the cell processor may have only a single SPE group and a single PPE group with a single SPE and a single PPE. Hardware resources can be shared between units within a group. However, the SPEs and PPEs must appear to software as independent elements.

In the example depicted in FIG. 1, the cell processor 100 includes a number of groups of SPEs SG-0 . . . SG_n and a number of groups of PPEs PG_0 . . . PG_p. Each SPE group includes a number of SPEs SPE0 . . . SPEg. The cell processor 100 also includes a main memory MEM and an input/output function I/O.

Each PPE group includes a number of PPEs PPE_0 . . . PPE_g SPE. In this example a group of SPEs shares a single cache SL1. The cache SL1 is a first-level cache for direct memory access (DMA) transfers between local storage and main storage. Each PPE in a group has its own first level (internal) cache L1. In addition the PPEs in a group share a single second-level (external) cache L2. While caches are shown for the SPE and PPE in FIG. 1, they are optional for cell processors in general and CBEA in particular.

An Element Interconnect Bus EIB connects the various components listed above. The SPEs of each SPE group and the PPEs of each PPE group can access the EIB through bus interface units BIU. The cell processor 100 also includes two controllers typically found in a processor: a Memory Interface Controller MIC that controls the flow of data between the EIB and the main memory MEM, and a Bus Interface Controller BIC, which controls the flow of data between the I/O and the EIB. Although the requirements for the MIC, BIC, BIUs and EIB may vary widely for different implementations, those of skill in the art will be familiar their functions and circuits for implementing them.

Each SPE is made includes an SPU (SPU0 . . . SPUg). Each SPU in an SPE group has its own local storage area LS and a dedicated memory flow controller MFC that includes an associated memory management unit MMU that can hold and process memory-protection and access-permission information.

The PPEs may be 64-bit PowerPC Processor Units (PPUs) with associated caches. A CBEA-compliant system includes a vector multimedia extension unit in the PPE. The PPEs are general-purpose processing units, which can access system management resources (such as the memory-protection tables, for example). Hardware resources defined in the CBEA are mapped explicitly to the real address space as seen by the PPEs. Therefore, any PPE can address any of these resources directly by using an appropriate effective address value. A primary function of the PPEs is the management and allocation of tasks for the SPEs in a system.

The SPUs are less complex computational units than PPEs, in that they do not perform any system management functions. They generally have a single instruction, multiple data (SIMD) capability and typically process data and initiate any required data transfers (subject to access properties set up by a PPE) in order to perform their allocated tasks. The purpose of the SPU is to enable applications that require a higher computational unit density and can effectively use the provided instruction set. A significant number of SPUs in a system, managed by the PPEs, allow for cost-effective processing over a wide range of applications. The SPUs implement a new instruction set architecture.

MFC components are essentially the data transfer engines. The MFC provides the primary method for data transfer, protection, and synchronization between main storage of the cell processor and the local storage of an SPE. An MFC command describes the transfer to be performed. A principal architectural objective of the MFC is to perform these data transfer operations in as fast and as fair a manner as possible, thereby maximizing the overall throughput of a cell processor. Commands for transferring data are referred to as MFC DMA commands. These commands are converted into DMA transfers between the local storage domain and main storage domain.

Each MFC can typically support multiple DMA transfers at the same time and can maintain and process multiple MFC commands. In order to accomplish this, the MFC maintains and processes queues of MFC commands. The MFC can queue multiple transfer requests and issues them concurrently. Each MFC provides one queue for the associated SPU (MFC SPU command queue) and one queue for other processors and devices (MFC proxy command queue). Logically, a set of MFC queues is always associated with each SPU in a cell processor, but some implementations of the architecture can share a single physical MFC between multiple SPUs, such as an SPU group. In such cases, all the MFC facilities must appear to software as independent for each SPU. Each MFC DMA data transfer command request involves both a local storage address (LSA) and an effective address (EA). The local storage address can directly address only the local storage area of its associated SPU. The effective address has a more general application, in that it can reference main storage, including all the SPE local storage areas, if they are aliased into the real address space (that is, if MFC_SR1[D] is set to '1').

An MFC presents two types of interfaces: one to the SPUs and another to all other processors and devices in a processing group. The SPUs use a channel interface to control the MFC. In this case, code running on an SPU can only access the MFC SPU command queue for that SPU. Other processors and devices control the MFC by using memory-mapped registers. It is possible for any processor and device in the system to control an MFC and to issue MFC proxy command requests on behalf of the SPU. The MFC also supports bandwidth reservation and data synchronization features. To facilitate communication between the SPUs and/or between the SPUs and the PPU, the SPEs and PPEs may include signal notification registers that are tied to signaling events. Typically, the PPEs and SPEs are coupled by a star topology in which the PPE acts as a router to transmit messages to the SPEs. Such a topology does not provide for direct communication between SPEs. Instead each SPE and each PPE has a one-way signal notification register referred to as a mailbox. The mailbox can be used for SPE to host OS synchronization.

The IIC component manages the priority of the interrupts presented to the PPEs. The main purpose of the IIC is to allow interrupts from the other components in the processor to be handled without using the main system interrupt controller. The IIC is really a second level controller. It is intended to handle all interrupts internal to a CBEA-compliant processor or within a multiprocessor system of CBEA-compliant processors. The system interrupt controller will typically handle all interrupts external to the cell processor.

In a cell processor system, software often must first check the IIC to determine if the interrupt was sourced from an external system interrupt controller. The IIC is not intended to replace the main system interrupt controller for handling interrupts from all I/O devices.

There are two types of storage domains within the cell processor: local storage domain and main storage domain. The local storage of the SPEs exists in the local storage domain. All other facilities and memory are in the main storage domain. Local storage consists of one or more separate areas of memory storage, each one associated with a specific SPU. Each SPU can only execute instructions (including data load and data store operations) from within its own associated local storage domain. Therefore, any required data transfers to, or from, storage elsewhere in a system must always be performed by issuing an MFC DMA command to transfer data between the local storage domain (of the individual SPU) and the main storage domain, unless local storage aliasing is enabled.

An SPU program references its local storage domain using a local address. However, privileged software can allow the local storage domain of the SPU to be aliased into main storage domain by setting the D bit of the MFC_SR1 to '1'. Each local storage area is assigned a real address within the main storage domain. (A real address is either the address of a byte in the system memory, or a byte on an I/O device.) This allows privileged software to map a local storage area into the effective address space of an application to allow DMA transfers between the local storage of one SPU and the local storage of another SPU.

Other processors or devices with access to the main storage domain can directly access the local storage area, which has been aliased into the main storage domain using the effective address or I/O bus address that has been mapped through a translation method to the real address space represented by the main storage domain.

Data transfers that use the local storage area aliased in the main storage domain should do so as caching inhibited, since these accesses are not coherent with the SPU local storage accesses (that is, SPU load, store, instruction fetch) in its local storage domain. Aliasing the local storage areas into the real address space of the main storage domain allows any other processors or devices, which have access to the main storage area, direct access to local storage. However, since aliased local storage must be treated as non-cacheable, transferring a large amount of data using the PPE load and store instructions can result in poor performance. Data transfers between the local storage domain and the main storage domain should use the MFC DMA commands to avoid stalls.

The addressing of main storage in the CBEA is compatible with the addressing defined in the PowerPC Architecture. The CBEA builds upon the concepts of the PowerPC Architecture and extends them to addressing of main storage by the MFCs.

An application program executing on an SPU or in any other processor or device uses an effective address to access the main memory. The effective address is computed when the PPE performs a load, store, branch, or cache instruction, and when it fetches the next sequential instruction. An SPU program must provide the effective address as a parameter in an MFC command. The effective address is translated to a real address according to the procedures described in the overview of address translation in PowerPC Architecture, Book III. The real address is the location in main storage which is referenced by the translated effective address. Main storage is shared by all PPEs, MFCs, and I/O devices in a system. All information held in this level of storage is visible to all processors and to all devices in the system. This storage area can either be uniform in structure, or can be part of a hierarchical cache structure. Programs reference this level of storage using an effective address.

The main memory of a system typically includes both general-purpose and nonvolatile storage, as well as special-purpose hardware registers or arrays used for functions such as system configuration, data-transfer synchronization, memory-mapped I/O, and I/O subsystems. There are a number of different possible configurations for the main memory. By way of example and without limitation, Table I lists the sizes of address spaces in main memory for a particular cell processor implementation known as Cell Broadband Engine Architecture (CBEA).

TABLE I

| Address Space | Size | Description |
| --- | --- | --- |
| Real Address Space | $2^m$ bytes | where $m \leq 62$ |
| Effective Address Space | $2^{64}$ bytes | An effective address is translated to a virtual address using the segment lookaside buffer (SLB). |
| Virtual Address Space | $2^n$ bytes | where $65 \leq 80$ A virtual address is translated to a real address using the page table. |
| Real Page | $2^{12}$ bytes | |
| Virtual Page | $2^p$ bytes | where $12 \leq p \leq 28$ Up to eight page sizes can be supported simultaneously. A small 4-KB (p = 12) page is always supported. The number of large pages and their sizes are implementation-dependent. |
| Segment | $2^{28}$ bytes | The number of virtual segments is $2(n - 28)$ where $65 \leq n \leq 80$ |

Note:
The values of "m," "n," and "p" are implementation-dependent.

The cell processor 100 may include an optional facility for managing critical resources within the processor and system. The resources targeted for management under the cell processor are the translation lookaside buffers (TLBs) and data and instruction caches. Management of these resources is controlled by implementation-dependent tables.

Tables for managing TLBs and caches are referred to as replacement management tables RMT, which may be associated with each MMU. Although these tables are optional, it is often useful to provide a table for each critical resource, which can be a bottleneck in the system. An SPE group may also contain an optional cache hierarchy, the SL1 caches, which represent first level caches for DMA transfers. The SL1 caches may also contain an optional RMT.

In embodiments of the present invention, the main memory MEM contains at some address, a primitive 102 that can be atomically accessed by the SPE and the PPE in a lock-free manner. The primitive 102 includes two or more data portions D1, D2 a parity byte P and an optional utility byte U. Information may be represented by the data in the primitive 102 may include a description of a task that an SPE should perform. In such a case the primitive 102 can contain a location in memory where the code to execute would reside and parameters for that code. Alternatively, the primitive 102 may also contain application state information. In the case of video games, examples of such information include game variables (how much life the player has), virtual world information (what is the position of this rock) or sound processing information. Code 104, 106 for accessing the primitive may be stored in the local store of one or more of the SPE, and/or L1 cache of one or more PPE and/or main memory MEM. As will be seen, the instructions are somewhat different for the SPE and the PPE, as such, there are two different sets of coded instructions, a first set 104 for the SPE and a different second set 106 for the PPE. As a practical matter, the first set 104 may be transferred to an SPE local store when needed by a SPE and the second set 106 may be transferred to an L1 cache when needed by a PPE. The codes 104, 106 may be subroutines or function calls of a larger program 108 stored in main memory MEM.

The code sets 104, 106 allow the SPE and PPE to access and update the primitive 102 in an atomic fashion. Both code sets rely on the parity byte P. The parity byte P determines which of the data portions D1, D2 is a valid portion and which is an invalid portion. The valid portion is the portion that contains relevant information. The invalid portion contains irrelevant data. The first code set 104 allows the SPE to read the data portions and parity byte and update the valid portion but does not allow the SPU to change the value of the parity byte P. The second code set 106 allows the PPE to read the valid portion and/or update the invalid portion of the primitive 102 and change the value of the parity byte P so that the invalid portion becomes the valid portion and vice versa.

Since both the SPE and PPE can access the primitive 102 both code sets 104, 106 include features that notify the PPE or SPE in the situation where first processor (SPE or PPE) reads the primitive and the primitive is overwritten by another processor before the first processor can update the primitive. These features make use of the well known instructions "read with reservation" and "conditional write". A read with reservation command, loads data from an address while setting a reservation in the address that will notify the processor making the reservation that another processor has tried to load data into the address between the reservation and a subsequent attempt to write to it. This command is often used in conjunction with the conditional write, in which a processor writes to the address only if the reservation has not been lost. Losing reservation means that the reserved data address could have been modified but does specify if it actually has been modified. To figure out whether it has been modified, the address must be read back in (e.g., with reservation) and the current value compared to the value of the address when it was reserved.

Conditional write and read with reservation may work as in the example that follows. A first SPU does conditional write to the primitive 102. If no other SPU writes to the primitive 102, the conditional write is successful. A second SPU then modifies the primitive 102 before the first SPU can perform a conditional write. When the first SPU tries to do the conditional write it finds that its reservation has been lost so the conditional write fails and the value of the primitive 102 is not updated.

The foregoing is intended to provide an introduction and description of the terminology used in cell processor implementations. The foregoing discussion is also intended to set forth a context for data structures and methods according to embodiments of the present invention. Such embodiments are not limited to implementation on or with cell processors having the architecture described above. However, any or all of the embodiments described below may be implemented using such cell architecture as an environment in which atomic operations that involve both the SPE and PPE may be encountered and utilized.

Figure 2:
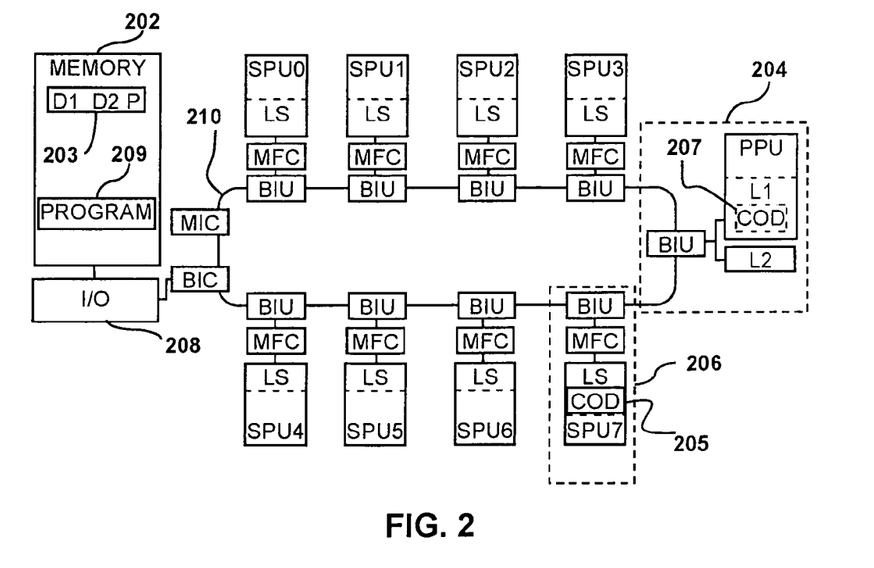
FIG. 2 is a schematic diagram of a cell processor according to an embodiment of the present invention.

FIG. 2 depicts an example of cell processor 200 configured to implement PPE and SPE accessible atomic operations according to an embodiment of the present invention. The cell processor 200 includes a main memory 202, a single PPE 204 and eight SPEs 206. However, the cell processor 201 may be configured with any number of SPE's. With respect to FIG. 2, the memory, PPE, and SPEs can communicate with each other and with an I/O device 208 over a ring-type element interconnect bus 210. The memory 202 contains a primitive 203 having features in common with the primitive 102 described above and a program 209 having features in common with the program 108 described above. At least one of the SPE 206 includes in its local store code 205 having features in common with the code 104 described above. The PPE includes in its L1 cache, code 207 having features in common with the code 106 described above. Codes 205, 207 may also be stored in memory 202 for access by the SPE and PPE when needed.

Figure 3:
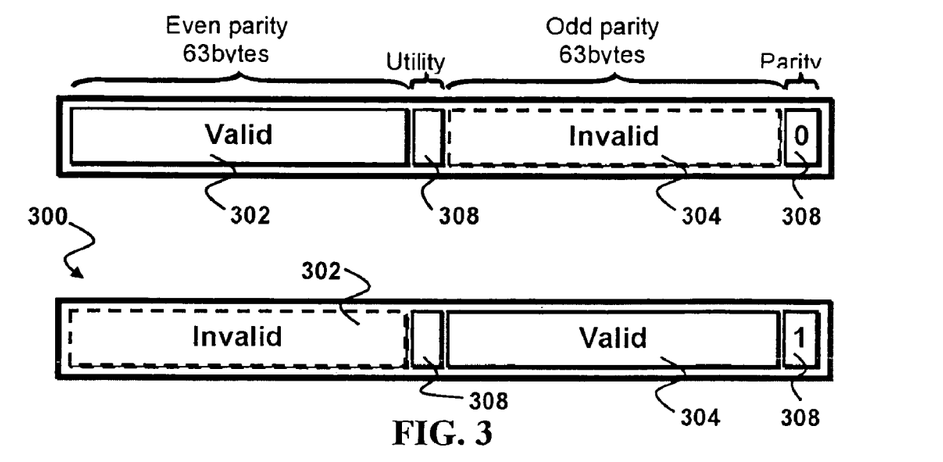
FIG. 3 is a block diagram illustrating a dual access primitive according to an embodiment of the present invention.

FIG. 3 illustrates a possible example, among others, of a primitive 300 that can be used in embodiments of the present invention. The primitive 300 is divided into two equal data portions, e.g., a left portion 302 and a right portion 304 that are of equal size. The entire primitive is of a size that can be accessed in a single DMA transfer by the SPE. The PPE reads or writes to the primitive in smaller sized subsections. By way of example, and without limitation, the primitive 300 may be configured to be interoperable with SPE that can operate atomically 128 bytes at a time and PPE that can operate atomically 8 bytes at a time. In this particular case, the primitive 300 may be based on a 63-byte atomic type that can be updated by both the PPE and the SPE. This is done by taking a 128 byte data element that the SPE can operate on, dividing it into two 63 byte portions and setting aside one byte from each half. A first leftover byte serves as a parity byte 306. A second leftover byte is referred to herein as a utility byte 308. As described above, only one the two portions 302, 304 has a meaningful value. The other portion is undefined or meaningless. The parity byte 306, which may be as small as a single bit, determines which half is valid. The division of the primitive 300 and setting of the initial value of the parity byte 306 can be done as part of an initialization stage of the program 108 that utilizes the primitive 300. By way of example, in the upper diagram, the parity byte 306 is set to the value zero (0) in which case the left portion 302 is valid and the right portion 304 is invalid. In the lower diagram, the parity byte 306 is set to the value one (1) in which case the left portion 302 is invalid and the right portion 304 is valid.

An SPU can atomically update the valid portion of the primitive 302 and does not change the value of the parity byte 306. However, the SPU does write back whatever parity byte value it had initially read. As a practical matter, the SPU may read in the value of entire primitive 302, modify only the valid portion and write back the updated value (including the unmodified parity byte value) to the location of the primitive 302 in main memory. A PPU can update the value of the invalid half 8 bytes at a time and then atomically swaps the parity byte.

Figure 4A:
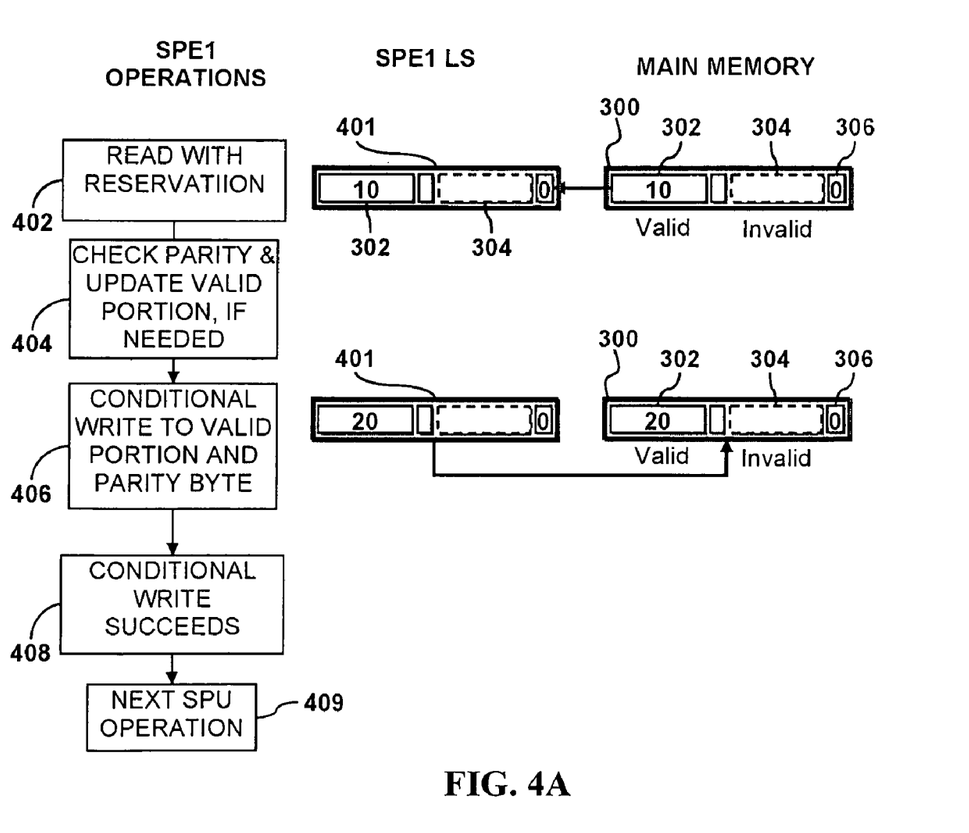
FIG. 4A is a flow diagram illustrating updating a dual access primitive with an SPU according to an embodiment of the present invention.

The flow diagram of FIG. 4A illustrates an example of atomic updating of the primitive 300 with an SPE. The left hand side of the diagram illustrates a method 400 that may be implemented as a series of code instructions executed by the SPU. The steps of the method 400 represent one possible example of the code instructions 104, referred to above. At 402 SPE performs a read with reservation on the full 128 bytes of the primitive 300. As shown in the diagram, the value of the entire primitive 300 is loaded into the SPE's local store 401. At 404, the SPE checks the parity byte to determine which half is valid. In this example, the parity byte has the value 0, which means that the left portion 302 is valid and the right portion 304 is invalid. In this example the left portion initially has the value "10". The SPU may change the value of the valid portion 302 in local store, e.g., to "20", according to coded instructions being executed by the SPE. For example, the SPE may increment a counter value in one or more bytes of the valid portion. However, the SPE does not change the value of the parity byte 306. At 406, the SPE then attempts to update the value of the primitive stored in main memory by performing a conditional write to the main memory address of the primitive 300. The conditional write attempts to write at least the valid portion 302 and the parity byte 306. As a practical matter, it may be simpler for the SPE to write back the entire updated value of the primitive 300 including the invalid right portion 304. If the conditional write is successful at 408, then the atomic 300 has been updated. The SPE may then proceed to its next operation at 409.

Figure 4B:
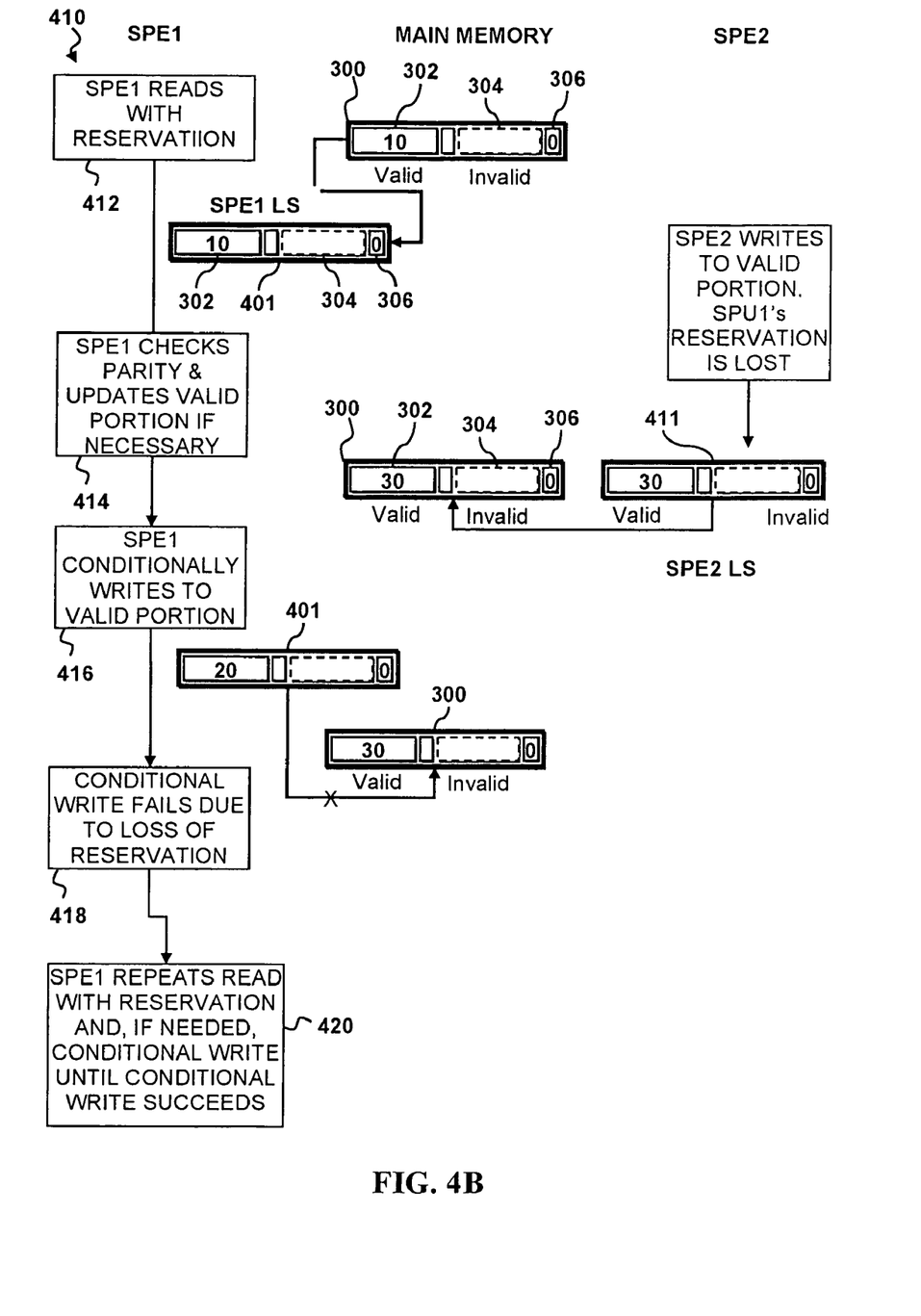
FIG. 4B is a flow diagram illustrating interrupted updating of a dual access primitive with an SPU according to an embodiment of the present invention.

The only way a conditional write won't fail is if there is no intervening write to the address of the primitive 300 between the read with reservation at 402 and the conditional write at 406. FIG. 4B illustrates an example of what may happen when a conditional write is not successful.

The left hand side of the diagram in FIG. 4B illustrates a method 410 that may be implemented as a series of code instructions executed by an SPU. The steps of the method 410 represent another possible example of the code instructions 104, referred to above. As in FIG. 4A, at 412 SPE1 performs a read with reservation on the full 128 bytes of the primitive 300 loading the value of the 300 into the SPE's local store 401. At 414, the SPE checks the parity byte to determine which half is valid. As in the previous example, the parity byte has the value 0, so the left portion 302 is valid and the right portion 304 is invalid. As in the previous example, the left portion 302 has the initial value "10". The SPE changes the value of the valid portion 302 in local store to "20" according to coded instructions executed by the SPE as in the previous example. The SPE does not change the value of the parity byte 306. At 416, SPE1 then attempts to update the value of the primitive stored in main memory by performing a conditional write to the main memory address of the primitive 300.

Although in the above examples, the SPE read all 128 bytes of the primitive 300 in a single operation, embodiments of the present invention encompass cases where The SPU may read the value of the primitive 300 in two or more stages. For example, to simplify the code 104 the SPE may initially read a half of the primitive 300 that contains the parity byte 306 into local store. For example, the SPE may initially read the right portion 304 and parity byte 306 (and optionally, the utility byte 308). The SPE may then check the value of the parity byte 306 to determine whether the valid portion has been read. If so, the portion that was read can be updated. If not, the SPU simply reads the rest of the primitive into local store writing over the portion it had read initially. This way, the desired data that is to be updated always winds up in the same location in the local store without having to align it.

However in this example, SPE2 has successfully written the value "30" to the valid portion 302 of the primitive 300 at 415 before the SPE1 has had a chance to execute the conditional write instruction at 416. In such a case, the SPE1's conditional write fails at 418 due to loss of reservation. The reservation may alternatively be lost if a PPE has been updating the invalid right portion 304 between the read with reservation at 412 and the conditional write at 416. To update the primitive, SPE1 must perform a successful conditional write. However, this may not be necessary depending on the updated value of the primitive 300 due to SPE2. For example, SPE2 may have set a value of one or more bytes of the valid portion indicating that a certain process has been completed and that the value of the primitive 300 is not to be overwritten. If so, SPE1 does not need to update the value of the primitive 300. In a more common case, SPE1 may still need to update the value of the primitive 300. At 420 SPE1 then reads in with reservation the new value of the atomic, updates it and, if needed, tries to do another conditional store. If it is not interrupted this time, the store is successful.

In embodiments of the present invention, the SPE do not modify the invalid portion of the primitive 300 or change the parity byte 306. However, when an SPE writes to the address of the primitive 300 it typically writes atomically to all 128 bytes. Thus, when the SPE writes back all 128 bytes it will write back the original parity byte value that it had read previously and also the original invalid portion. This may overwrite the invalid portion while the PPU is updating it in 8-byte sections. To ensure that the PPU is notified when this happens, the PPE performs a read with reservation and conditional write of the parity byte 306. Because the PPU has performed a read with reservation and conditional write for the parity byte, the PPU will be aware when it performs the conditional write of the parity byte 306 that the portion it has been updating has been overwritten since the reservation will have been lost.

Figure 5A:
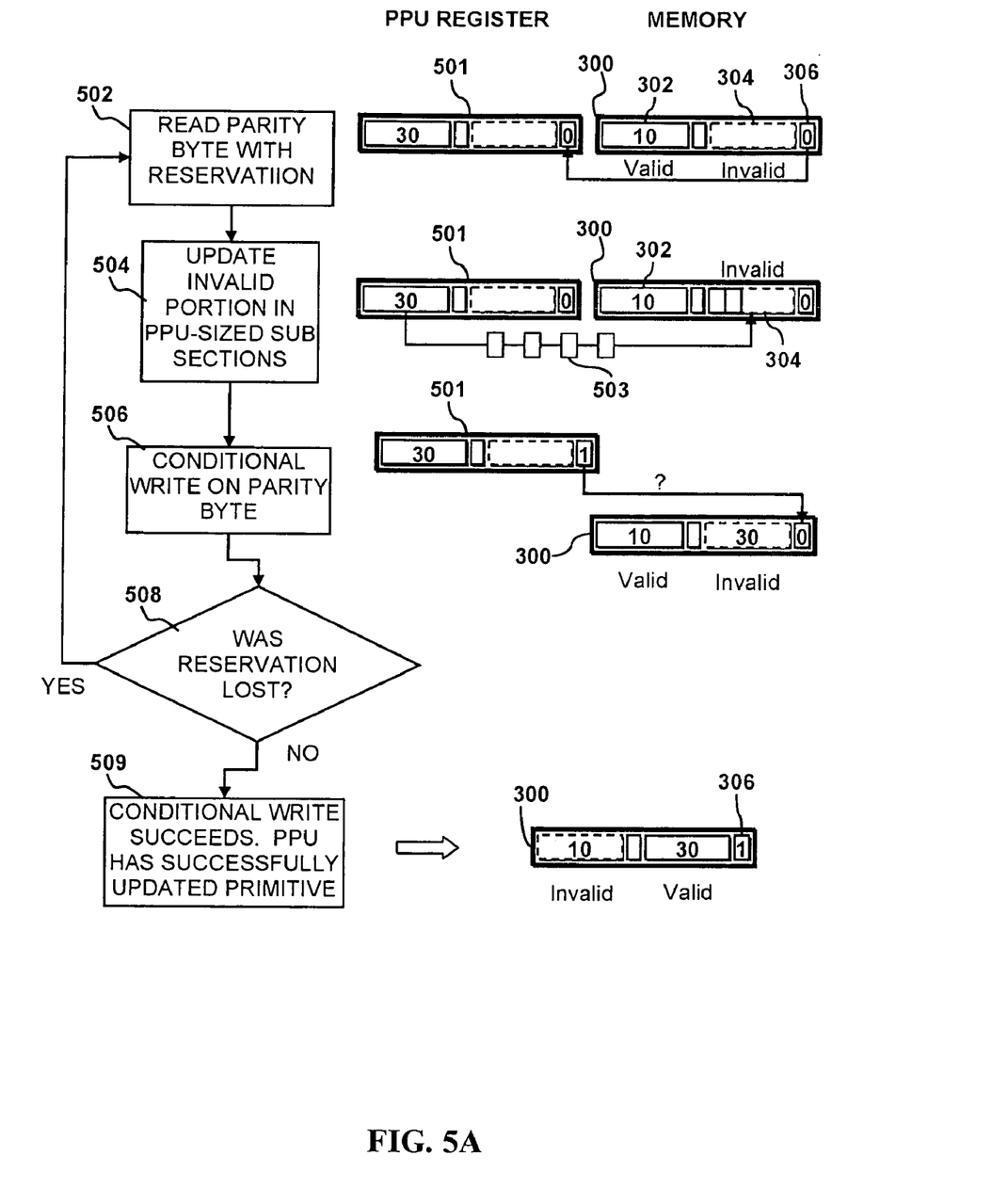
FIG. 5A is a flow diagram illustrating updating a dual access primitive with a PPU according to an embodiment of the present invention.

FIG. 5A illustrates an example how a PPE may atomically update the primitive 300. The left hand side of the diagram illustrates a method 500 that may be implemented as a series of code instructions executed by the PPU. The steps of the method 500 represent one possible example of a subset of the code instructions 106, referred to above. In this example, the PPE attempts to update the primitive by writing the value "30" to the invalid portion from registers in an L1 cache 501. At 502 the PPE performs a read with reservation on the parity byte 306 only. The value of the parity byte may be read into a register in the L1 cache 501 of the PPE. In this example, the parity byte 306 has a value of "0", which means that the left portion 302 is valid and the right portion 304 is invalid. At 504, the PPE then performs an update on the invalid portion 304 by successively writing to the location of the invalid right portion 304 in subsections 503 of 8 bytes or less at a time. The PPE doesn't actually need to update the invalid portion atomically. It can safely use non-atomic operations. Only writing of the parity byte must be atomic. However, in certain embodiments, writing atomically can be an "early out" for the PPE, which can restart the update process if an atomic write to the invalid portion fails. If the PPE doesn't use this early out, it will have to update all 63 bytes before atomically attempting to update the parity byte. The PPE may write as many subsections 503 as are necessary to update the information in the primitive 300 that needs to be updated. Once this is done, at 506 the PPE attempts to change the value of the parity byte 306 by performing a conditional write to the location of the parity byte. If at 508, the reservation was lost the conditional write of the parity byte fails then the SPU aborts and begins the process of updating the invalid right portion 304 all over again. If at 508 the reservation was not lost, the conditional write succeeds the PPU changes the value of the parity byte 306 at 509. In this example the parity byte value changes from a "0" to a "1" making the right portion 304 valid and the left portion 302 invalid.

Figure 5B:
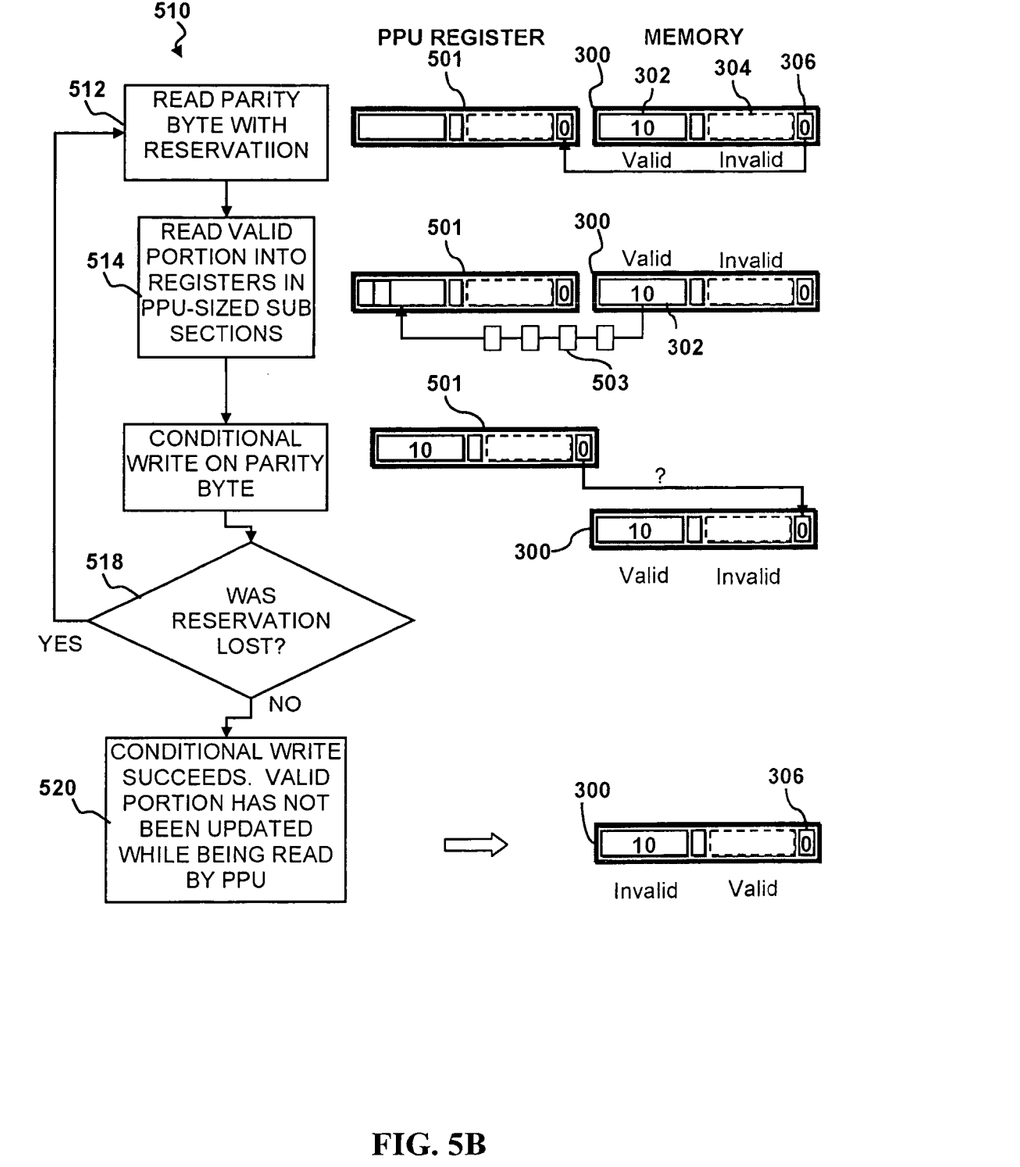
FIG. 5B is a flow diagram illustrating reading a dual access primitive with a PPU according to an embodiment of the present invention.

FIG. 5B illustrates an example how a PPE may atomically read the value of the primitive 300. The left hand side of the diagram illustrates a method 510 that may be implemented as a series of code instructions executed by the PPU. The steps of the method 510 represent an example of another possible subset of the code instructions 106, referred to above. At 512, the PPU performs a read-with-reservation on the parity byte 306. In this case the parity byte is a "0" and the left portion 302 is valid and the right portion 304 is invalid. At 514, the PPU reads the valid left portion 302, as determined by the parity byte 306, into registers of the L1 cache 501 in subsections 503, e.g., of 8 bytes at a time. At 516, the PPU performs a conditional-write on the location of the parity byte 306 in main memory to determine whether the value of the primitive 300 was updated while the PPU was reading it. Since the PPU is reading and not updating the valid portion of the primitive, the conditional write re-writes the value of the parity byte that was originally read during the read-with-reservation step. If another processor, e.g., an SPU, had updated the primitive while the PPE was reading the valid left portion 302, the conditional write on the parity byte will fail at 518, otherwise, it would succeed. The PPE may then repeat the sequence over again until the conditional write on the parity byte succeeds. The PPE may take other action depending on why the application (e.g., program 209) wanted to update the atomic 300. For example, if the application was trying to atomically increment the value of the left hand portion 302, then it will loop until it is able to increment it. It will not necessarily try to update to the same value every attempt.

The utility byte 308 may be used to provide additional functionality to the atomic operation. For example, there may be situations where an application would want the PPU to have better access to the primitive. Within the context of such applications it may be more important that the PPU rather than an SPU to update the value of the primitive. By way of example and with out limitation, the value of the utility byte 308 may serve to notify the SPEs whether the PPU has priority for updating the primitive 300. If the utility byte has a certain value, an SPE that reads the primitive 300 may then wait for a set number of cycles before reading or updating the primitive. The utility byte 308 may optionally include a few bits that indicate how many cycles the SPU should wait. Alternatively, the utility byte 308 may be used to indicate a size mask for the primitive, i.e., how many portions the primitive is divided into and/or how large each portion is. In addition, the utility byte 308 may be used for other utility functions such as flags, SPE priority, and other application-specific functionality. Those of skill in the art will also recognize that two or more bytes may be set aside for the utility byte 308 depending on the functionality to be implemented.

In embodiments of the present invention, it is possible for two or more different PPU processes, or threads, to be implemented within a given application. In general, only one PPU thread may update the primitive 300 at one time. An operating system (OS) level mutex must be used to perform mutual exclusion on different PPU threads. Primitive operations according to embodiments of the present invention are lock free. If a PPU process is context switched out in the middle of an update an SPU can still update the primitive. This provides a reasonable compromise that allows both the SPU and the PPU to operate on a common atomic type when needed. This is very important, for implementing lock-free programming on a cell processor. For example input and output (e.g., to CD-ROM, controllers, network cards) are typically handled by a PPU process. With a primitive that both the SPU and PPU can operate on atomically the SPUs can continue to process when the PPU switches to other input/output process. This could help avoid a significant decrease in performance.

Although much of the preceding discussion addresses cell processors having a single PPE and multiple SPE, those of skill in the art will recognize that embodiments of the invention may also be applicable to cell processor architectures, such as CBEA, having multiple PPEs. Note that in cell processors where there are more than one PPE it is preferable for there to be a single Mutex for all PPEs so that only one process on a single PPE can be updating the atomic at a time.

Embodiments of this invention work when there are smaller atomic processes that share main memory. Embodiments of the present invention include different grain sizes on atomic processes (i.e., atomic processes other than those involving a 128 byte data structure split into 63-byte halves with two leftover bytes) where two different processors access a shared main memory. A sufficiently large sized primitive may be divided into any appropriate number of smaller sized portions. The parity byte may take on more than two values with each value indicating which portion of the atomic is valid. By way of example, a 65 byte atomic may be divided into 8 portions of 8 bytes each with an extra byte having at least three bits left over for the parity byte. The parity byte may therefore have values that range from 0 to 7 with each value indicating which one of the 8 portions is valid.

Embodiments of the present invention facilitate utilization of the large size atomic operations that are possible with the SPE while making such atomics accessible to the smaller sized atomic operations of the PPE. Embodiments of this invention may be used in SPU task management, particularly when it is important for both the SPUs and the PPU to be able to atomically add new tasks to be executed.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In processor system having two or more processors including a main memory, a power processor element (PPE) and a synergistic processor element (SPE) that have different sized memory transfer capabilities, a method for atomic operation, the method comprising the steps of:
   a) dividing a main memory address containing a primitive into a parity byte and two or more portions, wherein the parity byte includes at least one bit, wherein a value of the parity byte determines which of the two or more portions is a valid portion and which of the two or more portions is an invalid portion, wherein the primitive is of a memory size that is larger than a maximum size for a memory transfer operation with the PPE and less than or equal to a maximum size for a memory transfer operation with the SPE;
   b) with the SPE, performing a read with reservation on a value of the parity byte and at least the valid portion;
   c) with the SPE, updating the valid portion to produce an updated valid portion; and
   d) with the SPE, conditionally writing back the value of the parity byte without changing it and writing the updated valid portion to the address containing the primitive, whereby the SPE writes the updated valid portion to the address containing the primitive if the reservation has not been lost; and
   e) if the reservation has been lost, repeating steps b), c) and d) with the SPE until the conditional write is successful.

2. The method of claim 1 further comprising updating the invalid portion with the PPE by performing a read with reservation of the parity byte, writing to one or more subsections of the invalid portion, wherein each subsection is of a size that the PPE can update in a single memory transfer operation, performing a conditional write of a new value to the parity byte, and, upon successful completion of the conditional write operation, changing a value of the parity byte.

3. The method of claim 2 wherein if a reservation for the parity byte is lost while the PPE is updating the invalid portion, the PPE re-reads the parity byte with reservation and reads the valid portion into one or more registers of the PPE.

4. The method of claim 1 further comprising reading a value of the valid portion with the PPE by performing a read with reservation of an initial value of the parity byte and performing successive read operations on one or more subsections of the invalid portion, wherein each subsection is of a size that the PPE can update in a single memory transfer operation, and, performing a conditional write upon the parity byte with the initial value.

5. The method of claim 1 wherein the primitive is of a size less than or equal to a register size of the SPE.

6. The method of claim 1 wherein the primitive is of a size less than or equal to a register size of the SPE and wherein each subsection is less than or equal to a register size for the PPE.

7. The method of claim 1 wherein the primitive is a 128 byte primitive.

8. The method of claim 1 wherein the primitive is a 128 byte primitive and the subsections are 8-byte subsections.

9. The method of claim 1 wherein the primitive is a 128-byte primitive and the two or more portions include two 63-byte portions.

10. The method of claim 1 wherein the PPE performs atomic operations 8 bytes at a time and the SPE performs atomic operations 128 bytes at a time and wherein the primitive is a 128-byte primitive and the two or more portions include two 63-byte portions.

11. The method of claim 1 wherein the primitive further includes a utility byte having stored therein additional information that can be accessed by either the SPE or the PPE.

12. The method of claim 11 wherein the extra information notifies the SPE whether the PPE or another SPE has priority for updating the primitive.

13. The method of claim 11 wherein the utility byte includes size mask information for the primitive.

14. The method of claim 1 wherein the primitive is divided into and first and second portions wherein a first portion includes the parity byte.

15. The method of claim 14 wherein step b) includes reading the first portion into a PPE local store register; determining from the parity byte whether the first portion is valid; and if the first portion is not valid reading the second portion into the PPE local store register, whereby the valid portion is aligned within the PPE local store.

16. The method of claim 1 wherein step b) includes reading the entire primitive into the PPE local store at once; and determining from the parity byte which portion is valid.

17. A cell processor, comprising:
   a data bus
   a main memory coupled to the data bus, the main memory containing one or more task definitions;

a power processor element (PPE) coupled to the data bus;
one or more synergistic processing elements (SPE) coupled to the data bus, wherein each SPE has a synergistic processor unit (SPU) and a local store; and
a main memory having embodied at an address therein a primitive, the primitive being of a memory size that is larger than a maximum size for a memory transfer operation with the PPE and less than or equal to a maximum size for a memory transfer operation with the SPE, the primitive including a parity byte and two or more portions, wherein the parity byte includes at least one bit, wherein a value of the parity byte determines which of the two or more portions is a valid portion and which of the two or more portions is an invalid portion.

18. The cell processor of claim 17, further comprising a set of processor executable instructions embodied in the local store of on one or more SPE, wherein the instructions are configured to implement a method for updating the primitive with the SPE, wherein the method comprises the steps of:
a) with the SPE, performing a read with reservation on the parity byte and at least the valid portion;
b) with the SPE, updating the valid portion to produce an updated valid portion; and
c) conditionally writing back the value of the parity byte and writing the updated valid portion to the address containing the primitive, whereby the SPU writes the updated valid portion to the address containing the primitive if the reservation has not been lost; and
d) if the reservation has been lost, repeating steps a), b) and c) with the SPE until the conditional write is successful.

19. The cell processor of claim 17, further comprising a set of processor executable instructions embodied in one or more registers of the PPE wherein the instructions are configured to implement a method for updating the primitive with the PPE, wherein the method comprises the steps of:
with the PPE, performing a read with reservation of the parity byte, writing to one or more subsections of the invalid portion, wherein each subsection is of a size that the PPE can update in a single memory transfer operation,
with the PPE, performing a conditional write of a new value to the parity byte, and,
upon successful completion of the conditional write operation, changing a value of the parity byte with the PPE to the new value, wherein the new value makes the invalid portion valid and the valid portion invalid.

20. The cell processor of claim 17, further comprising a set of processor executable instructions embodied in one or more registers of the PPE wherein the instructions are configured to implement a method for reading a value of the valid portion with the PPE, wherein the method comprises the steps of:
with the PPE, performing a read with reservation of an initial value of the parity byte,
with the PPE, performing successive read operations on one or more subsections of the invalid portion, and
with the PPE, performing a conditional write upon the parity byte with the initial value.

21. The cell processor of claim 17 wherein the primitive is of a size less than or equal to a register size of the SPE.

22. The cell processor of claim 17 wherein the primitive is of a size less than or equal to a register size of the SPE and wherein each subsection is less than or equal to a register size for the PPE.

23. The cell processor of claim 17 wherein the primitive is a 128 byte primitive.

24. The cell processor of claim 17 wherein the primitive is a 128 byte primitive and the subsections are 8-byte subsections.

25. The cell processor of claim 17 wherein the primitive is a 128-byte primitive and the two or more portions include two 63-byte portions.

26. The cell processor of claim 17 wherein the PPE is configured to perform memory transfer operations 8 bytes at a time and the SPE are configured to perform memory transfer operations up to 128 bytes at a time and wherein the primitive is a 128-byte primitive and the two or more portions include two 63-byte portions.

27. The cell processor of claim 17 wherein the primitive further includes a utility byte having stored therein additional information that can be accessed by either the SPE or the PPE.

28. The cell processor of claim 27 wherein the extra information notifies the SPE that the PPE has priority for updating the primitive.

29. The cell processor of claim 27 wherein the utility byte includes size mask information for the primitive.

30. The cell processor of claim 27 wherein the primitive is divided into and first and second portions wherein a first portion includes the parity byte.

31. In processor system having two or more processors including a main memory, a power processor element (PPE) and a synergistic processor element (SPE) that operate on different sized register lines, a method for using the PPE to atomically update a primitive that can be read or written to in a single operation with the SPE, the method comprising the steps of:
dividing a main memory address containing the primitive into a parity byte and two or more portions, wherein the parity byte includes at least one bit, wherein a value of the parity byte determines which of the two or more portions is a valid portion and which of the two or more portions is an invalid portion, wherein the primitive is of a memory size that is larger than a maximum size for a memory transfer operation with the PPE and less than or equal to a maximum size for a memory transfer operation with the SPE;
with the PPE, performing a read with reservation of the parity byte,
with the PPE, writing to one or more subsections of the invalid portion, wherein each subsection is of a size that the PPE can transfer in a single operation,
with the PPE, performing a conditional write of a new value to the parity byte, and, upon successful completion of the conditional write operation, changing a value of the parity byte with the PPE.

32. In processor system having two or more processors including a main memory, a power processor element (PPE) and a synergistic processor element (SPE) that have different sized memory transfer capabilities, a method for using the PPE to atomically read a primitive that can be read or written to in a single operation with the SPE, the method comprising the steps of:
dividing a main memory address containing the primitive into a parity byte and two or more portions, wherein the parity byte includes at least one bit, wherein a value of the parity byte determines which of the two or more portions is a valid portion and which of the two or more portions is an invalid portion, wherein the primitive is of a memory size that is larger than a maximum size for a memory transfer operation with the PPE and less than or equal to a maximum size for a memory transfer operation with the SPE;

performing a read with reservation of an initial value of the parity byte with the PPE;

performing successive read operations on one or more subsections of the invalid portion with the PPE, wherein each subsection being of a size that the PPE can transfer in a single operation; and performing a conditional write upon the parity byte with the initial value with the PPE.

\* \* \* \* \*